June 23, 1931. F. R. WOODWARD Re. 18,111
ROLL
Original Filed Dec. 12, 1929
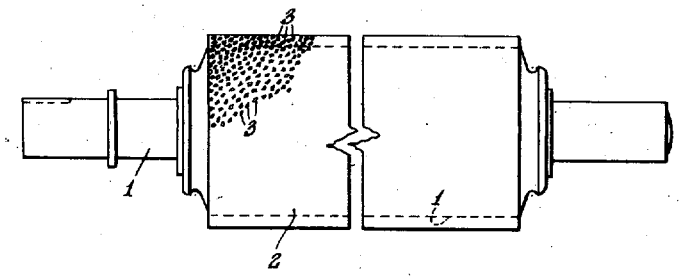
INVENTOR
Frederick R. Woodward
BY
William Richt Morse
ATTORNEYS Reissued June 23, 1931

Re. 18,111

UNITED STATES PATENT OFFICE

FREDERICK R. WOODWARD, OF NEWTON, MASSACHUSETTS, ASSIGNOR TO STOWE & WOODWARD COMPANY, OF NEWTON UPPER FALLS, MASSACHUSETTS, A CORPORATION OF MASSACHUSETTS

ROLL

Original No. 1,787,890, dated January 6, 1931, Serial No. 413,483, filed December 12, 1929. Application for reissue filed May 2, 1931. Serial No. 534,683.

The principal object of my invention is to provide an acting surface or periphery to which material will not adhere when such material passes along or around said roll and, while my roll is especially useful as a top press roll in paper making machines to prevent the pulp from sticking to the roll, it is useful for other rolls in paper making machines and elsewhere.

A feature of my invention is the use of a plurality of pieces of rock or stone for a portion of the active surface of the roll and under the generic term rock I include, for example, granite, sand, gravel, quartz and emery. The pieces of rock are, for the purpose of gaining economy without departing from efficiency, held in desired position by a binder and as a binder I prefer to use rubber, which term includes any suitable rubber compound. This construction is very economical because an inexpensive cast iron core may be used.

In the figure of the drawing, which is an elevation of a roll embodying my invention, the cast iron core 1 carries the roll 2 made of rubber and granite, the latter being indicated at 3 at the acting surface of the roll.

In making my roll I grind the rock to the desired size and, of course, it may be suitably sifted to make sure that the size is correct. An example of such a grinding and classification which has given excellent results is the production of the material in such condition that it will pass through a 20-mesh sieve and stay on a 60-mesh sieve. When so ground and classified the rock is mixed or compounded with a suitable binder such as rubber which is fully effective to hold the ground rock in the desired position, especially at the acting surface of the roll, but which is cheaper than the rock. When rubber is used suitable vulcanizing of the roll to the core 1 will preferably be had. I much prefer to use crystalline rock, such as granite or sand, because they are held in place very effectively by even a film of the rubber or rubber compound.

In compounding my roll I prefer to use about five pounds of rubber or rubber compound to about twenty pounds of rock.

Rolls of the character described when used in paper making machines are usually operated with a doctor pressed against them and the doctor has had a glazing action on the surface of the roll tending to cause the paper to stick to the roll but the fact is, as proved by my experiments, that no such tendency exists with my use of rock. Further my roll has made a distinct advance in the art not only in the result accomplished but in economy of manufacture.

What I claim is:

1. A roll comprising pieces of rock forming a portion of the active surface of the roll; and a binder of material other than said rock for holding said pieces in the desired position.

2. A roll comprising pieces of crystalline rock forming a portion of the active surface of the roll; and a rubber binder holding said pieces in the desired position.

3. A roll comprising pieces of granite forming a portion of the active surface of the roll; and a rubber binder holding said pieces in the desired position.

4. A roll comprising a core; pieces of rock forming a portion of the active surface of the roll; and a binder connected to the core and holding said pieces in the desired position.

5. A roll comprising a core; pieces of crystalline rock forming a portion of the active surface of the roll; and a binder connected to the core and holding said pieces in the desired position.

6. A roll comprising a core; pieces of granite forming a portion of the active surface of the roll; and a binder connected to the core and holding said pieces in the desired position.

7. A top press roll comprising pieces of rock forming a portion of the active surface of the roll; and a rubber binder holding said pieces in the desired position.

8. A roll comprising pieces of rock forming a portion of the active surface of the roll; and a rubber binder holding said pieces in the desired position, said rock and rubber being in the proportion of about twenty pounds of rock to about five pounds of rubber.

In testimony whereof, I have affixed my signature to this specification.

FREDERICK R. WOODWARD.

DISCLAIMER

Re. 18,111.—*Frederick R. Woodward*, Newton, Mass. ROLL. Reissue Patent dated June 23, 1931. Disclaimer filed October 2, 1935, by the assignee, *Stowe-Woodward, Inc.*

Hereby makes the following disclaimer:

It disclaims in line 9 of the specification the words "and elsewhere".

Under claims 1, 2, 3, 4, 5, 6, and 8, it disclaims from the scope of said claims all rolls, if such be in law comprehended by said claims in their present form, other than paper machine rolls for operation in contact with a moist web.

[*Official Gazette October 29, 1935.*]